United States Patent [19]

Kalverboer

[11] 3,744,311
[45] July 10, 1973

[54] METHOD OF AND APPARATUS FOR TESTING MONITORING ORGANS IN A TURBINE INSTALLATION

[75] Inventor: Cornelis Kalverboer, Nussbaumen, Switzerland

[73] Assignee: Aktiengesellschaft Brown, Boveri & Cie, Baden, Switzerland

[22] Filed: Mar. 23, 1971

[21] Appl. No.: 127,246

[30] Foreign Application Priority Data
Mar. 31, 1970 Switzerland.................... 4759/70

[52] U.S. Cl. ........................................ 73/168, 73/4
[51] Int. Cl. ........................................ F01d 21/20
[58] Field of Search.................. 73/168, 4 R, 2; 137/57; 415/17

[56] References Cited
UNITED STATES PATENTS
2,617,438  11/1952  Doran................................. 73/4 R
3,429,180  2/1969  Vind..................................... 73/168

Primary Examiner—Richard C. Queisser
Assistant Examiner—Denis E. Corr
Attorney—Pierce, Scheffler & Parker

[57] ABSTRACT

Two sets of speed and pressure monitoring organs are located respectively in two safety systems normally operated in parallel and independently of each other for protecting a turbine against overspeed and also against overpressure in a unit such as a water separator or the like located in the gas flow path. In order to test the monitoring organs of both systems for determining whether or not they would function properly in the event of an actual overspeed or overpressure condition, one of the safety systems is taken out of service while the other continues to monitor actual turbine speed and pressure, and vice versa, and the speed and pressure monitoring organs of the safety system removed from service are then tested by introducing test speed and pressure values.

6 Claims, 1 Drawing Figure

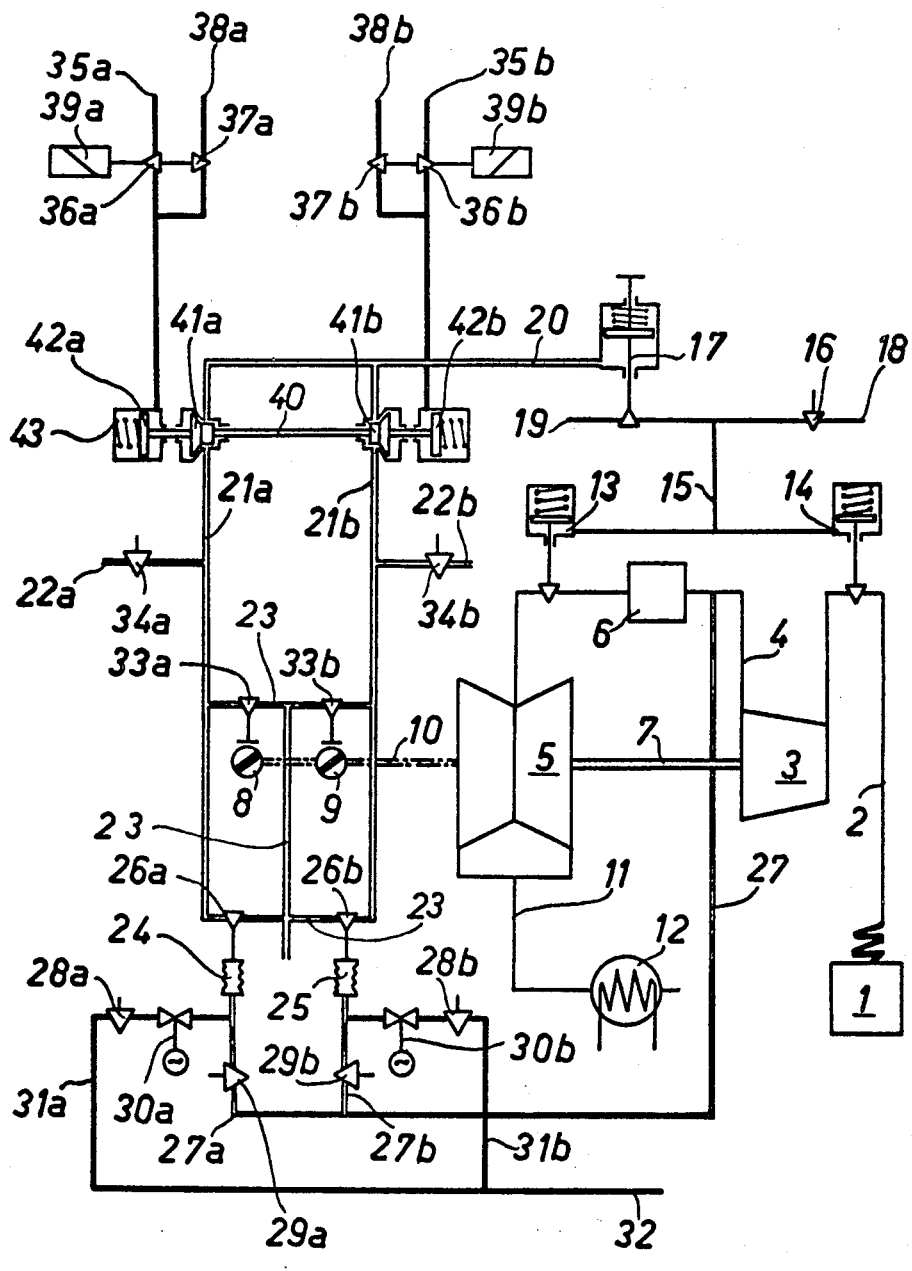

METHOD OF AND APPARATUS FOR TESTING MONITORING ORGANS IN A TURBINE INSTALLATION

The present invention relates to an improved method for testing monitoring organs in a turbine installation against overspeed of the turbine and also against overpressuring in a tank such as that housing a water separator, superheater or the like in the intermediate steam line thereof by two mutually independent safety systems for the control of hydraulically and/or electromagnetically operated valves, each of the safety systems being controlled as a function of a speed monitor and simultaneously of a pressure monitor uncoupled from the speed monitor, and an apparatus for carrying out this method.

The arrangement of pressure tanks in thermal power installations, in particular between the individual working stages of a turbine installation, brings up the necessity of protecting such tanks from undue overpressure. In thermal power installations, for example, with boiling water reactors as a heating arrangement, such tanks are either water separators or superheaters located between the high-pressure section and the low-pressure section of a steam turbine.

Protection of a tank against overpressure is one of the primary tasks exacted by the government authorities. With the development of safety devices and the ever stricter regulation it has become necessary to be able to check this device for its effectiveness. Especially in the development of radioactively radiating or radioactively operated power plant installations, this factor should be applied more stringently.

The problem underlying the present invention is to test the mutually independent control systems for the protection of the tank against overpressure during operation without having to throttle the steam turbine installation in its output or even turning it off, while at the same time maintaining the safety and control systems of the steam turbine and of the tank.

According to the invention, this problem is solved in that one of the safety systems controlling the monitoring organs against overpressure is connected to a testing system operated independently of the safety systems, which testing system is controllable hydraulically and/or electromagnetically, whereby the pressure and speed monitors are checked for their effectiveness, and that the parallel existing second system carries out the safety regulation of the turbine installation during the checking of the monitoring organs of the first safety system.

A device for carrying out the method is characterized by a testing system connected to parallel-connected safety systems of the monitoring organs and consisting of a separating valve operable by control relays and valves, which valve is connected directly with the safety systems, and consisting of a pressure testing system of higher pressure level than that of the intermediate steam line which can be connected in the testing state.

The advantages of the invention result from the continuous monitoring of the pressure tank during operation, double safety being assured at all times, since even when the monitoring or control organs of one safety system are being checked, the controllability and supervision of the power plant installation is maintained.

The advantage resulting from the double safety system and control — the elimination of break plates, safety valves and the respective lines on pressure tanks endangered by over-pressure — is welcomed both from a standpoint of economic, as well as technics since, on the one hand, the production costs can be greatly reduced and, on the other hand the previously restricted space conditions can be improved.

In boiling water reactors, the steam carries with it radioactive-radiation particles and must therefore not be discharged into the atmosphere. For this reason it is of advantage to employ existing monitoring systems with the testing method, as thereby a letting off of the steam can be avoided completely. Thus, also the danger of radioactive pollution is banned.

The invention will be further explained with reference to the accompanying drawing, the single view of which presents in a somewhat diagrammatic manner an example of construction of the double safety system and of the test circuits connected thereto.

A heating device 1, which represents, for example, a boiling water reactor, is connected via a fresh steam line 2 with the high-pressure section 3 of the turbine. The exhaust steam of the high-pressure stage 3 is supplied via the intermediate steam line 4 to the lower-pressure stage 5 of the turbine. Through line 11 exhaust steam from the low pressure stage 5 is introduced into the condenser 12, after which the condensate is returnable to the reactor 1 for reheating. On an extended part of the turbine shaft 7, which is indicated symbolically by a dash-dot double line 10, there are disposed two speed monitors 8 and 9.

Located in the intermediate steam line 4 between the high and low pressure turbine sections is a water separator 6 which is to be protected against internal overpressure. For carrying out the protective measures there are provided a rapid-closing valve 14 in the fresh steam line 2 and a rapid-closing valve 13 in the intermediate steam line 4, both rapid-closing valves 13, 14 being supplied with pressurized oil via line 15. The pressurized oil is admitted through line 18 from a suitable pressurizing source and can flow off again through line 19 to a return sump.

For pressureless control or respectively for the closing of valves 13, 14, by their loading springs, a flow restrictor 16 is lodged in the pressure medium supply line 18, on the one hand and a spring loaded, fluid actuated control valve 17 is placed in the pressure medium discharge line 19, on the other hand. For actuating the control valve 17 to a more closed position, it is connected via fluid pressurized line 20 with the safety system 21a and also with the safety system 21b, which are connected in parallel. The safety systems 21a, 21b are provided with pressurized oil feed lines 22a and 22b, in which flow restrictors 34a, 34b for adjustment of the pressure are arranged.

The subscripts of the reference symbols mentioned in the description and in the drawing are arranged so that like subscripts are correlated with the safety system 21a, 21b marked with the same subscript. An exception was made only with the device to be tested (pressure monitor or speed regulator), to make clear the different functions.

The two safety systems 21a, 21b are subsequently connected with the pressure monitor 24 or 25 correlated with a safety system, namely, via the blocking valves 26a and 26b controllable independently, of the pressure monitors, which valves are lodged respectively in the lines of the safety systems 21a, 21b.

Another connection exists from the individual parallel-connected safety systems 21a, 21b to the speed monitors 8 and 9 via the blocking valves 33a and 33b which are controllable as a function of these monitors and are arranged also for controlling the safety systems 21a, 21b in the outflow lines 23.

The pressure monitors 24, 25 are connected, besides the connection with the safety systems 21a, 21b, via the monitoring lines 27a, 27b 27 to the intermediate steam line 4. It is thereby possible to monitor continuously the steam pressure prevailing in the intermediate steam line 4. To be able to effect a testing of the pressure monitors 24, 25, however, it is necessary to bring the pressure monitors 24, 25 into connection with a system of higher pressure 32. For this purpose flow restrictors 29a and 29b are installed in the pressure monitoring lines 27a, 27b, which restrictors permit a pressure build-up largely independent of the intermediate steam between the pressure monitors 24 and 25 and two other restrictors 28a or 28b, which are located respectively in branch lines 31a, 31b connected with line 32 of the higher pressure level system provided. Mechanically or hydraulically actuatable cut-off valves 30a, 30b are located respectively in the branch lines 31a, 31b which permit selective connection to or disconnection of the higher pressure level system 32 from the pressure monitors 24, 25.

With this device it is now possible to check the pressure monitors 24, 25 selectively for their effectiveness without having to effect a disconnection of the monitoring or of the safety system. The checking of the speed monitors 8 and 9 is done in the conventional manner, which need not be described in detail as it is continuously used.

During normal operation, the two safety systems 21a, 21b operate in parallel to provide double protection. System 21a monitors turbine shaft speed and pressure in the intermediate steam line 4 by means of the overspeed and pressure monitors 8 and 24, and the other system 21b likewise monitors turbine shaft overspeed and the pressure in steam line 4 by means of the speed and pressure monitors 9 and 25. In order to be able to test the overspeed and pressure monitors in each of the two safety systems, it is necessary to temporarily separate the two safety systems so that system 21a can be tested while the other system 21b remains in operation, and vice versa. This is effected by means of a compound slide valve assembly 43 which includes one cut-off valve member 41a correlated to safety system 21a, and another cut-off valve member 41b correlated to safety system 21b. The two valve members 41a, 41b are mechanically interconnected by means of a rod 40, and they are actuatable hydraulically and conjointly by means of spring loaded pistons 42a, 42b. When both of the pistons 42a, 42b are subjected to the same fluid pressure, the resultant forces applied by the fluid, acting in opposite directions, respectively on these pistons, serve to maintain the valve members 41a, 41b in a central, valve-open position, and the respective fluid pressures of the two safety systems 21a, 21b are put through in parallel to control line 20 leading to the safety cut-off valve 17. Should per chance neither of the pistons 42a, 42b be subjected to hydraulic pressure, the loading springs associated therewith will serve to also maintain the valve members 41a, 41b in a central, balanced position such that both of the valves are open and the respective fluid pressures of the safety systems 21a, 21b are put through in parallel to the control line 20.

The cut-off valve 41a is controlled by an auxiliary pressurized line 35a leading to piston 42a through a valve 36a controlled by a relay 39a which can be of the electromagnetic type. Another valve 37a also controlled by relay 39a is located in a return-to-sump line 38a, the arrangement being that when relay 39a is actuated, valve 36a closes and valve 37a opens thus relieving piston 42a of pressure and permitting the pressure existing on piston 42b to move the cut-off valve 41a via the rod 40 to its closed position thus isolating safety system 21a from line 20. The safety system 21b remains in operation since when valve 41a closes, the other valve 41b merely moves to a more open position as a result of the movement of piston 42b.

In a similar manner, cut-off valve 41b is controlled through auxiliary pressurized line 35b leading to piston 42b through valve 36b controlled by electromagnetic relay 39b, and another valve 37b also controlled by relay 39b is located in return-to-sump line 38b. When relay 39b is actuated, piston 42b is thus relieved of pressure thus causing cut-off valve 41b to shift to its closed position by the pressure remaining on piston 42a and isolate safety system 21b from line 20 while the other safety system 21a remains in its normal operating state to monitor pressure at the tank of water separator 6 and the turbine overspeed.

The process for the testing of the pressure monitors 24, 25 and overspeed monitors 8 and 9 will now be described in its various steps.

To test the safety system 21a, control relay 39a is energized thus to cause valve 41a to be displaced unti' line 20 is separated from the safety system 21a. Then the overspeed monitor 8, which is connected to the separated safety system 21a, is checked for its effectiveness in that the mass of the centrifugal weights on the monitor is increased continuously until the blocking valve 33a responds and clears the discharge 23.

For the testing of the pressure monitor 24, the cut-off valve 30a is gradually opened, so that it becomes possible to supply the pressure medium of higher level to the pressure monitor 24. The valve 30a is opened until the pressure reaches a magnitude at which the pressure monitor 24 responds and the blocking valve 26a opens; hence, the monitoring organ transmits a signal which would be indicative of a dangerously high pressure within the water separator 6.

The testing of the safety system 21a can be terminated in a simple manner by closing the valve 30a, the pressure monitor 24 then transmitting to the blocking valve 26a its command to block the outflow line 23.

Relay 39 is then restored to its initial position thus effecting a build-up of pressure in the pressure line 35a, whereupon valve 41a is restored to its rest i.e. its open position, whereby the testing for system 21a is completely turned off. All during the testing of safety system 21a, the other safety system 21b remains in service. The safety system 21b is tested by the same process by actuating 41b to its closed position, whereupon the process repeats in the same sequence of steps, the other safety system 21a being unaffected and continuing to monitor overspeed and pressure.

I claim:

1. In a gaseous fluid turbine system, the combination comprising a pair of safety systems normally operated in parallel and independently of each other and which are connected into the turbine system to protect the turbine against overspeed and also against an overpressure in the path of the gas flow through the turbine system, each said system including an overspeed monitor responsive to turbine shaft speed and a pressure monitor responsive to pressure in said gas flow path, means responsive to either monitor of either safety system for shutting off the gas flow to the turbine, and means for selectively taking each one of said safety systems out of service while the other safety system continuesto perform its monitoring functions in order to test the operability of the monitors of the safety system taken out of service.

2. A turbine system as defined in claim 1 wherein each of the two safety systems operating in parallel is of the pressurized fluid type and a response of either the speed or pressure monitor serves to de-pressurize the system, and wherein said means for selectively taking one of said systems out of operation while the other system continues to perform its monitoring function comprises selectively operable valve means for disconnecting one or the other of said pressurized fluid safety systems from said monitor responsive gas flow shut-off means.

3. A turbine system as defined in claim 2 wherein said selectively operable valve means for disconnecting one or the other of said pressurized fluid safety systems is constituted by a compound slide valve, said slide valve including mechanically coupled valve members respectively correlated to said safety systems and which normally are in their open position, and means for selectively actuating said valve members such that as one valve member moves in a closing direction the other valve member moves in a non-closing direction.

4. A turbine system as defined in claim 1 which further includes an auxiliary pressure source for testing said pressure monitors, wherein each of the two safety systems operating in parallel is of the pressurized fluid type and a response of either the peed or pressure monitor serves to depressurize the system, wherein said means for selectively taking one of said systems out of operation while the other system continues to perform its monitoring function comprises selectively operable valve means for disconnecting one or the other of said pressurized fluid safety systems from said monitor responsive means which serves to shut off gas flow to said turbine, and wherein for selective testing of said pressure monitors valve means are provided for applying said auxiliary pressure to said pressure monitors on a progressively increasing basis.

5. A gaseous fluid turbine system as defined in claim 1 and which further includes an auxiliary pressure source providing a test pressure higher than that of the normal pressure conditions existing in said turbine system, and means connecting said auxiliary pressure source into each of said pressure monitors.

6. In the method for testing each of two safety systems including speed and pressure monitors connected into a turbine system and which systems are normally operated in parallel and independent of each other for protecting the turbine against overspeed and also against any overpressure in the path of the gas flow through the turbine system, the steps which include taking the first one of said safety systems out of service while the second safety system continues to provide its monitoring functions, testing the operability of the speed monitor of said first safety system and testing the operability of the gas flow pressure monitor of said first safety system by application of a progressively variable pressure thereto from an auxiliary source of pressure higher than that of the normal pressure conditions existing in said turbine system, restoring said first safety system to service, taking said second safety system out of service while said first safety system continues to provide its monitoring functions, testing the operability of the speed monitor of said second safety system and testing the operability of the gas flow pressure monitor of said second safety system by application of a progressively variable pressure thereto from said auxiliary source of pressure higher than that of the normal pressure conditions existing in said turbine installation, and finally restoring said second safety system to service operation in parallel with said first safety system.

* * * * *